Jan. 5, 1965   F. K. PREIKSCHAT   3,164,827
AIRCRAFT NAVIGATION AND LANDING CONTROL SYSTEM
Filed Oct. 30, 1961   9 Sheets-Sheet 1
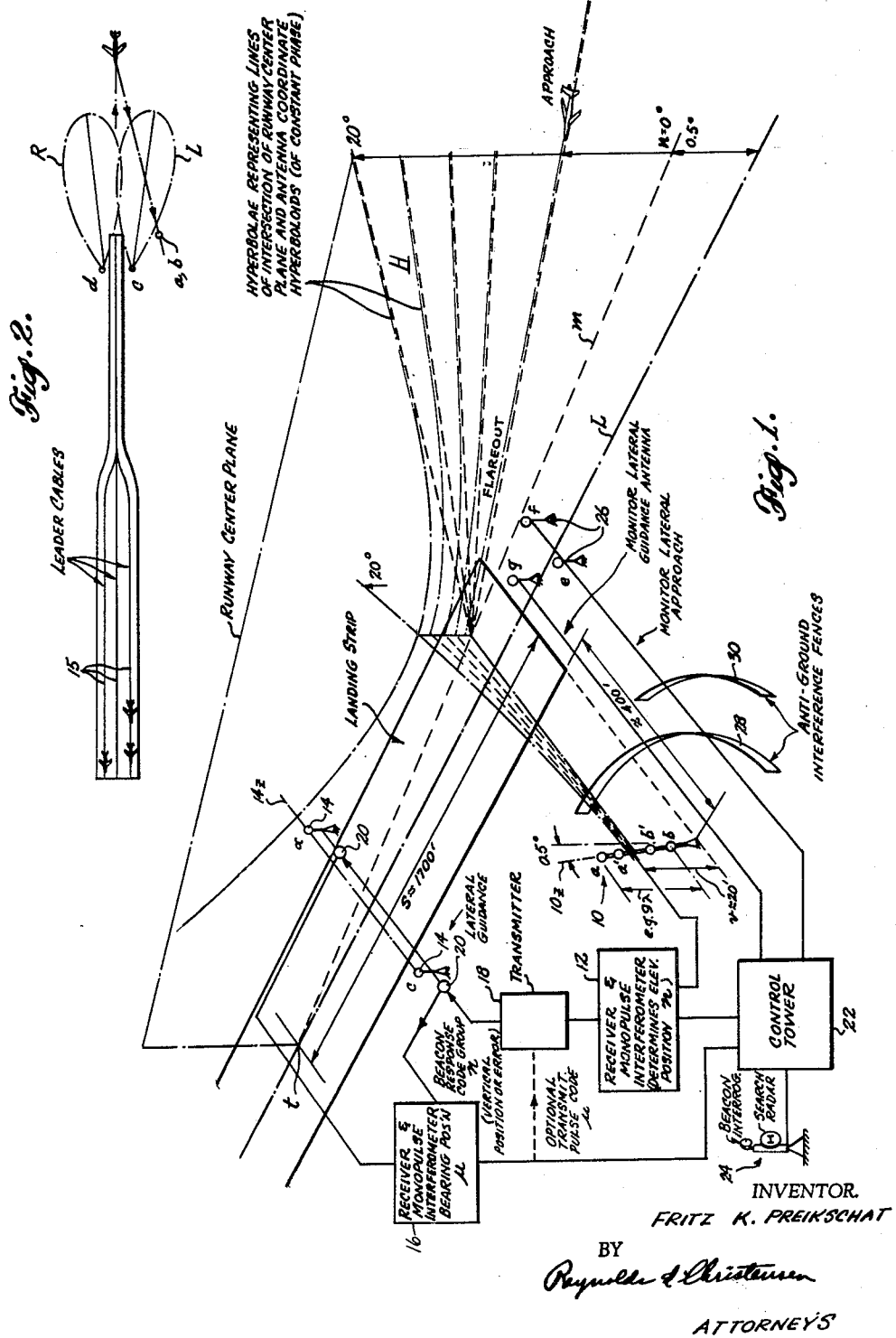
INVENTOR.
FRITZ K. PREIKSCHAT
BY
Reynolds & Christensen
ATTORNEYS Jan. 5, 1965 F. K. PREIKSCHAT 3,164,827
AIRCRAFT NAVIGATION AND LANDING CONTROL SYSTEM
Filed Oct. 30, 1961 9 Sheets-Sheet 2
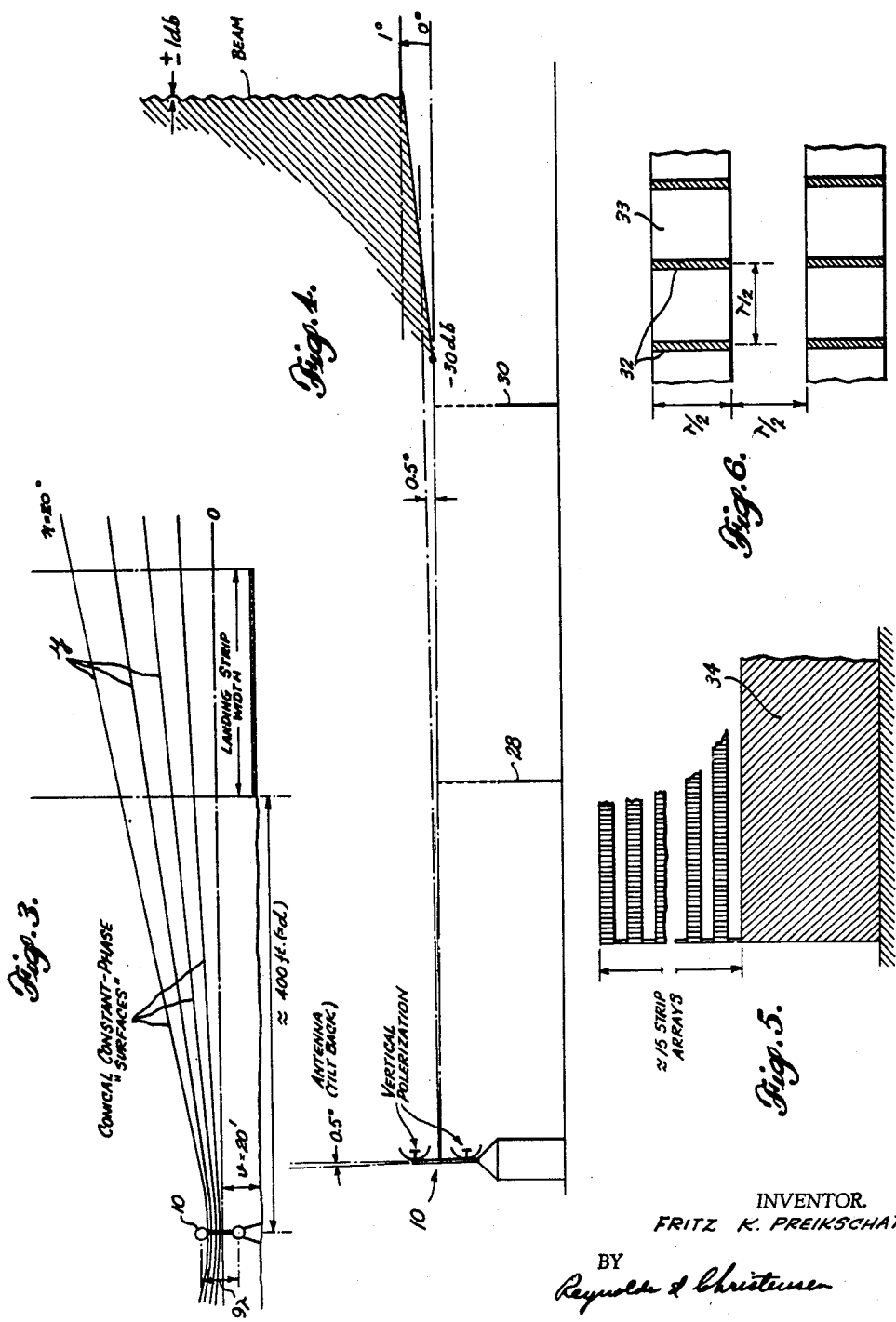
INVENTOR.
FRITZ K. PREIKSCHAT
BY
Reynolds & Christensen
ATTORNEYS

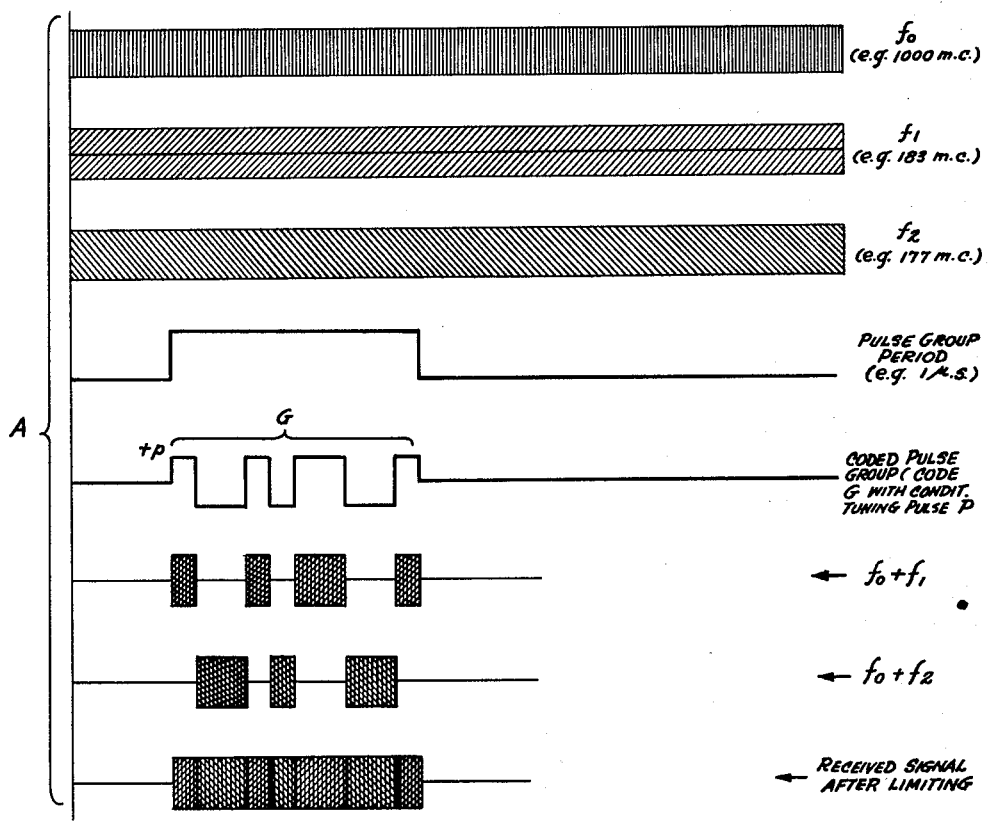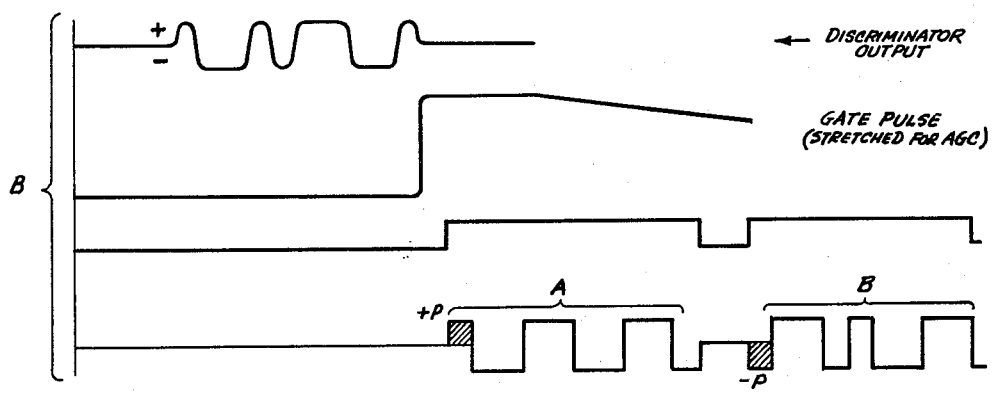
Fig. 7.

GROUND SEARCH SYSTEM
(LONG RANGE NAV.)

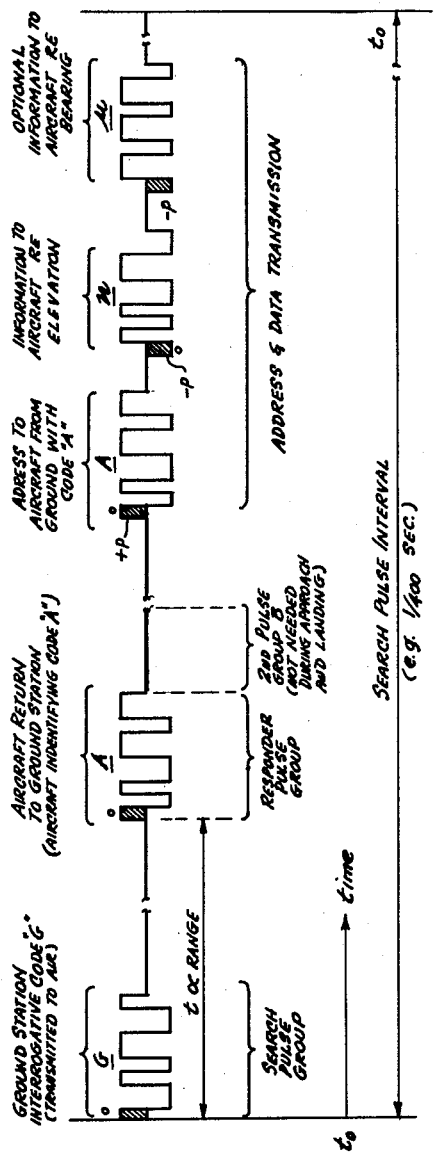

3,164,827
AIRCRAFT NAVIGATION AND LANDING CONTROL SYSTEM
Fritz K. Preikschat, Bellevue, Wash., assignor to The Boeing Company, Seattle, Wash., a corporation of Delaware
Filed Oct. 30, 1961, Ser. No. 148,494
28 Claims. (Cl. 343—6.5)

This invention relates to new and improved systems for controlling aircraft traffic and for guiding aircraft to a landing under blind landing conditions. Aspects of the invention may be used in conjunction with existing traffic cotrol and landing systems and in conjunction with transitional stages during conversion from existing conventional systems into complete new systems employing this invention; moreover, principles of the invention may be applied for meeting all navigational and landing guidance requirements of aircraft not only in limited areas but over the entire surface of the earth, if desired. The invention is herein illustratively described primarily by reference to the presently preferred embodiments and manner of practicing the same as applied to the blind landing of airplanes. However, it will be recognized that certain modifications and changes therein may be made with respect to details and that certain extensions and adaptations of the novel principles involved may be employed without departing from the essential features thereof.

A broad object hereof is to provide a safe and reliable system in which flight control data may be provided simultaneously to a number of aircraft in different stages of approach and landing. It is an object to derive and transmit such data on a substantially instantaneous and continuous basis and by monochannel ground station equipment associated with a landing strip or runway.

It is a related object to provide a relatively simple system of this character which will operate with the mathematical precision and calibration-maintaining reliability of digital type apparatus. A further object is to distinguish reliably and automatically between aircraft from the ground station, and to distinguish between airports or between landing strips at the same airport from the aircraft. Maintaining data separation for different aircraft approching the same runway or different runways in a traffic control pattern are further objectives hereof.

Still another and related object is to provide such a system in which complete data may be made available in the control tower covering all aircraft within the approach lanes of the landing field and, if necessary, similar complete data may be provided to all such aircraft through added data transmission equipment.

A further object of the invention is to provide a monochannel, multi-aircraft service system in which binary digital bits of data are transmitted recurringly to all aircraft within the field of the system at such a rapid recurrence rate that conventional or specialized indicators in the aircraft can, by inherent integrative effect, furnish smoothly changing continuous indications. This overcomes the former necessity of relying upon pilot judgment or complex computer equipment to perform integration from pieces of data transmitted only at long intervals.

Still another object is to provide an improved blind landing system featuring antenna means capable of determining the positions of all aircraft in the approach and landing region with the necessary high degree of accuracy but without resort to moving antenna parts as in conventional scanning systems. A related object is to prevent the distortion effects of ground returns and reflections on the antenna pattern by which landing path is defined and monitored, so that control will be both reliable and non-ambiguously definitive.

Another object is to provide a practicable heavy-traffic landing control system in which coded binary data and identification impulses transmitted from each aircraft may be utilized to monitor aircraft location from the ground station and wherein coded identification and/or binary data impulses transmitted from the ground station may be utilized at each aircraft for identifying and determining range to the ground station and for guiding the aircraft vertically and laterally to a landing.

Minimal equipment requirements in the aircraft is also an objective. In fact, with this invention it becomes possible to provide one multipurpose instrument in the aircraft backed up by a similar standby instrument, without incurring more cost or weight and space penalty than with the multiude of single-purpose instruments used conventionally.

The improved system also achieves the objective of providing the desired rapid flow of data without transmitting unnecessarily. Specifically, the system is devised to transmit data from the ground station only as requested by interrogation of aircraft in need of and in position generally to receive such data, an arrangement which permits the ground station to be shared by as many aircraft as possible within its field of influence.

A further object is to provide a system of automatic gain control which, in conjunction with the novel landing control system, suppresses the effects of sporadic noise and makes possible operation of a total system on each of several runways at the same airport or at different airports in close proximity to each other without interference between systems. Moreover, during the search or navigation phase, when the aircraft is navigating to the landing lanes of the air field, such automatic gain control in the aircraft provides a more usable response by permitting the aircraft transponder to return the interrogation pulses from a ground station radar, for which it is coded, only during the time the main lobe of such radar is pointed to the aircraft.

In accordance with this invention as herein disclosed, for vertical guidance, at least one array or pair of receiving antennae, sensitive to electromagnetic radiation directed from the aircraft, are stationed at a location preferably offset laterally by a safe distance from the landing strip in approximately transverse alignment with the initial end thereof. Mounted at an elevation slightly above the level of the runway, these antennae are placed one above the other in a line tilted back from the vertical by a small angle representing approximately the desired touchdown slope angle, e.g., 0.5 degrees. By phase comparison of the received energy in the two antennae, as measured in a monopulse interferometer system, such as that disclosed in my copending application Serial No. 116,547, filed June 12, 1961, now Patent No. 3,113,315, entitled "Phase Comparator Microwave Energy Direction Finder," a composite receiving pattern is created represented by a system of hyperbolic coordinates in the vertical central plane of the landing strip and in planes parallel thereto. These define a series of alternately usable glide paths differing from each other in slope so that if the approaching aircraft strays from one desired path it may as easily follow another in which it finds itself as a consequence. The resultant data thus derived at the ground station is transmitted to the aircraft on an instantaneous and continuous basis, along with horizontal position data derived by associated lateral guidance system which may operate by similar principles.

While the antennae which define and monitor glide path vertically are located a substantial distance from only one side of the landing strip, it is preferred that the antennae which monitor and define glide path laterally comprise antenna elements mouted at respectively opposite sides of the landing strip.

Still other features reside in the antenna system for vertical guidance and monitoring employing specially constructed anti-ground interference fences assuring a sharp cut-off of the composite antenna radiation pattern by as much as 30 db in one degree of angular change of the radiation pattern at the desired low cut-off elevation angle and which also insure a uniform intensity pattern without serious dips or nodes above that angle. The novel antenna system fence structures employ a screening conductive fence topped by a special array of half-wavelength conductive elements extending to the desired height of subtention of antenna angle.

While the received energy directed from the approaching aircraft and utilized to define and monitor the approach may be energy reflected from the aircraft after transmission by a ground antenna, or may comprise CW energy originating in the aircraft itself, it is a further feature of this invention more particularly to provide this received energy in the form of the response of a beacon transponder in the aircraft which is coded to identify the particular aircraft to that ground station.

As a further feature of this invention, the aircraft beacon transpdoner responds to ground station interrogation in the form of coded identifying pulse groups. Furthermore, it is a feature of the system, in case the interchange, as preferred, is initiated by ground station interrogation of the aircraft, to receive the aircraft transponder-identifying code pulse group and to retransmit back to the aircraft that same pulse group from a ground station transponder as a readdress to the aircraft. The aircraft system then selectively decodes its own identifying pulse group addressed back to it and thereby is enabled to recognize as its own the immediately ensuing coded pulse groups carrying positional data transmitted by the ground station. In this manner all aircraft interrogated by the same ground station may be conditioned to respond with their own identifying code pulse groups and receive back from the ground station their own unique positional data which they need for guidance, with means to identify that data and without confusion or interference with or from data transmission to other aircraft in the same vicinity. Moreover, as previously stated as an objective, the system permits aircraft to follow one another to a landing in relative close order under heavy traffic conditions while maintaining a substantially continuous flow of data to all through this technique. To this end each pulse group may require a total time interval only of a microsecond, more or less, which represents a very small fraction of the total transponder cycle, i.e., typically 1/400 of a second. Thus, one airplane may follow the other to a landing by a spacing of as little as two thousand feet without conflict between the code pulse group exchanges between the ground station and the respective aircraft.

If desired, the interrogation may be initiated by the aircraft itself in a two-way instead of a three-way interchange. In that event, the aircraft identifies itself by its identifying code pulse group on the interrogation and the ground station addresses the aircraft with its own identifying code pulse group followed, if desired, by the identifying code pulse group of the ground station, and then by position data necessary for the guidance of the aircraft. In this manner, each station identifies the other and transmits the necessary data for automatic indication of flight path.

Certain additional features reside in the novel automatic gain control system featuring, in the aircraft receiver, a decoder of the identifying ground station code pulse transmissions and an amplitude gate operated by the decoder to feed to a gain control bias circuit a portion of the received energy, with provision for storing some of that energy on a pulse-to-pulse basis. As a result, gain variation of the receiver is caused to follow the pattern of the main lobe of the ground station radar or to adjust the receiver sensitivity to the intensity level of signals from the desired ground station without interference from random noise or transmissions from other ground stations having a different code. During the navigational phase, wherein aircraft position is being tracked by a ground station radar with a plan position indicator, for example, the aircraft transponder automatic gain control provides side lobe suppression for the ground radar system assuring a clean and angularly restricted identifying signal mark on the indicator screen.

Still another feature resides in the novel binary system for identification and data transmission employing an encoder operating a carrier modulator selective of either of two modulation frequencies applicable to the transmitter mixer. In accordance with still another feature, the invention contemplates use of one of the two modulation frequencies to lead the identifying code pulse groups and the other frequency to lead the data-transmitting code pulse groups, thereby to distinguish one from the other. The opposing receiving apparatus in each case incorporates detector apparatus responsive to the particular frequency which leads the received code pulse group, thereby to condition the identification decoder channel or the data decoder channel for operation accordingly.

Still other features of the invention reside in the novel encoder and decoder circuit apparatus in the respective transponder systems, including provisions for appropriate sequential operation of the same insuring rejection of unwanted code pulse groups (i.e., those addressed to other aircraft or to a different ground station), and for achieving instant response to an appropriately addressed code pulse group.

These and other features, objects and advantages of the invention will become more fully evident from the following description thereof by reference to the accompanying drawings.

FIGURE 1 is a simplified perspective view of a landing field installation employing this invention and illustrating certain antenna characteristics for establishing and monitoring glide path.

FIGURE 2 is a simplified plan view at reduced scale showing the field and a means for guiding airplanes into different branching sections of runway.

FIGURE 3 is a transverse section of the landing strip supplementing the showing in FIGURE 1 of certain antenna characteristics.

FIGURE 4 is a side elevation of a novel antenna and anti-ground reflection fence system for controlling antenna intensity pattern in a vertical plane; while FIGURE 5 is a fragmentary face view of such a fence and FIGURE 6 is an enlarged fragmentary detail thereof.

FIGURE 7 is a timing diagram showing relationship of code pulse group sequences in the novel system of data communication during navigation phases.

FIGURE 14 is a wave diagram illustrating typical code forms used in the operation of such a system.

Figure 8:
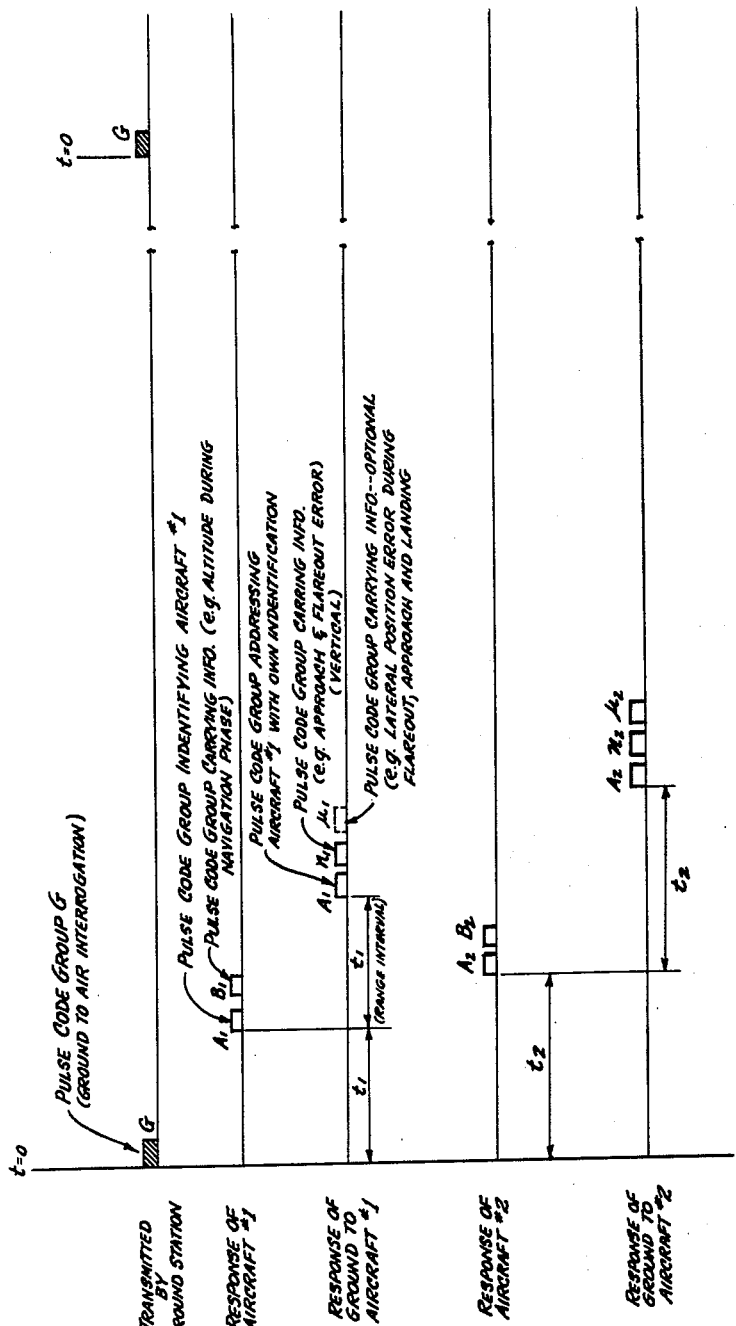
FIGURE 8 is a timing diagram showing more principles used in this communication system during landing phases.

Referring to the drawings, the landing control system comprises an antenna array 10 operable in conjunction with associated interferometer type receiver apparatus 12 such as that disclosed and claimed in my copending application Serial No. 116,547, filed June 12, 1961, referred to above, in order to define and monitor glide path in terms of elevation, and preferably also an antenna array 14 and associated receiver and monopulse interferometer apparatus 16 for doing likewise in a lateral sense. The array 10 comprises antenna elements $a$ and $b$ spaced one above the other and preferably operable with vertical polarization. These elements are arranged in a line which is tilted back from the vetical by a small angle such as 0.5 degrees representing the desired final touchdown slope angle for a landing airplane. If desired, an additional antenna element or set of antenna elements, $a'$, $b'$, may be mounted in the same relationship and disposition whereby one set of elements functions in the interferometer as a coarse scale position finder and the other set as a fine or vernier device. An important feature of the invention resides in the use of a phase comparator type receiving system such as that described in said application, and which in this case is mounted at a ground location offset laterally from the landing strip L at its leading or initial end by a safe distance, such as of the order of four hundred feet. This offset location serves two basic purposes one of which, of course, is that of safety through avoidance of projecting structures in the close vicinity of the landing strip. The second and fundamental purpose in terms of system function is that of creating a definitive composite antenna pattern which will inherently provide a system of characteristic "surfaces" in space defining usable glide paths in elevation.

More specifically the phase comparator antenna system incorporating the antenna array 10 and the receiver 12 sets up a composite pattern characterized by a series of hyperboloid surfaces $y$ (FIGURE 3) symmetrical about the inclined axis 10$z$ of the array and intersecting the runway center plane in a series of hyperbolae $h$ which individually represent points all of which, in any one such curve, lie at electrical distances from the array which differ by a constant amount. If a coarse and vernier array are both used there will be two systems of hyperbolae in this plane. That shown in FIGURE 1 represents one set.

In reference to these hyperbolic glide paths defined by characteristic lines of the composite antenna pattern, it will be noted from a comparison of FIGURES 1 and 3 that when the array 10 is offset by a substantial distance $d$ from the side of the landing strip the hyperboloids approximate conical surfaces of very gradual curvature where they overlie the landing strip, and where these surfaces intersect a longitudinal vertical plane overlying the landing strip the intersection is defined by the hyperbola of corresponding gradual slope. The hyperbolae thus defined in the runway center plane or in parallel planes overlying the runway converge together downwardly to the leading or initial end of the runway into parallel relationship at this point with the slightly sloping median plane of the antenna array perpendicular to its axis 10$z$, which plane intersects the runway center plane at a line $m$ inclined in this case at 0.5 degrees to the horizontal. The array 10 is elevated above the plane of the runway by a distance $v$ which may be of the order of twenty feet in order to cause the line $m$ to be incident on the runway at the desired point of touchdown spaced rearwardly from the initial end by a distance $s$. This latter distance may be of the order of seventeen hundred feet. If an airplane approaching landing follows any one of the hyperbolic lines $h$, which are sufficiently shallow in slope for a suitable approach, the airplane will pass over the initial end of the runway at a proper glide path slope and at a proper elevation for assuming the desired ultimate glide path slope $m$ for touchdown. At this point of passing over the initial end of the runway the airplane decreases its elevation sufficiently to meet with and follow along the glide path touchdown slope line $m$. Even though the hyperboloid surfaces $y$ slope at different angles to the horizontal in regions overlying the runway (FIGURE 3), this difference in slope is very small for those hyperboloid surfaces of interest in following a suitably shallow approach as to present no problem. Moreover, and of particular significance, the nearer the airplane approaches the initial end of the runway the less will be such differences in slope. The manner in which the receiver system and its associated antenna characteristics are utilized to guide the airplane during the approach will be described more fully at a later point herein.

In similar manner the two antenna elements $c$ and $d$ of array 14, which are mounted at respectively opposite sides of the landing strip on an axis 14$z$, provide lateral guidance to an approaching airplane. These antenna elements are mounted preferably back some distance from the initial end of the landing strip, preferably in the vicinity of the touchdown point $t$, although immediate proximity to the touchdown point is not necessary inasmuch as the hyperboloid surfaces defined by the elements $c$ and $d$ along the runway converge only very small angles over a substantial fraction of the length of the runway beyond the transverse axis 14$z$ of these antenna elements. Moreover, the airplane is practically on the ground by the time it passes the axis 14$z$ and requires little or no navigational guidance laterally at that time.

Once the airplane touches down it may be guided by any of different selectively energized leader cables 15 which branch into different paths. Appropriate receiving apparatus in each airplane (not shown) may be set to cause the airplane to track one path or the other in accordance with the identifying energization frequency or other tracking information radiating locally from the individual leader cables. Thus, different audio frequencies may be used to energize the respective leader cables and the antenna receiver can be set to track one or another of these frequencies by guiding the airplane accordingly, thereby to permit the landing field to handle a maximum volume of air traffic by appropriate routing of each airplane immediately upon touchdown so as to make room for airplanes to follow.

While lateral guidance array 14 may be used strictly for receiving, it is preferred to employ this array as a transmitting array also. Energy transmitted in impulses by the array 14 when energized by the transmitter 18 is directed along the length of the runway into the approach region thereof and while somewhat localized in order to minimize conflict with similar transmission patterns from other landing strips at the same airport or in the vicinity thereof must have sufficient width, such as of the order of sixty degrees beam-width at the half-power points, in order to be readily found by aircraft navigating into position for making an approach. A transmit-receive switch 20 at each of the antenna elements $c$ and $d$ permit these elements to function as both transmitter and receiver antennas in the conventional manner. Information from both receivers 12 and 16 is or may be fed to the control tower 22. A search radar with beacon interrogation provisions, 24, is desirable at the landing field for use by the control tower in programming traffic control and for use by the airplane if desired in determining its general navigational position, as will later be mentioned in more detail herein.

As will later appear herein, transmission of impulses from antenna elements $c$ and $d$, which are preferably symmetrically located with respect to the runway center line, is utilized for purposes of interrogating approaching aircraft and also for purposes of conveying positional information to such aircraft. It is necessary that the ground station incorporate transmission facilities for at least the latter of these purposes and preferably also for the former inasmuch as it is usually desirable to initiate the interchange from the ground station. In the preferred case, equipment in both the ground station and in the aircraft comprises beacon transponder apparatus, whereas in the case in which interrogation is initiated by the aircraft only the ground station need include a transponder as such, at least for purposes of conducting the landing itself. For navigational purposes, however, it is desirable that the aircraft also include transponder equipment which will enable the search radar to identify the aircraft through action of its beacon interrogator transmitter and likewise will enable the aircraft to identify the relative position of the ground station through use of a coded interrogation, as will be more fully described hereinafter. Furthermore, it is possible to use these same antenna elements $c$ and $d$ as localizer antennae which may serve separately as a means to guide airplanes to a landing which have only conventional landing instruments. This will serve in transitional stages during converting of existing systems to the present system totally. To this end, one of the two overlapping beam patterns as depicted in FIGURE 2 is modulated with a signal indicating to the pilot departure to the right of the center line of approach and the other is modulated to indicate departure to the left of the center line. Preferably these modulations are on a separate carrier differing in frequency from that used for transmitting and receiving code pulse groups in accordance with the present invention.

Additional ground station facilities may include an antenna array 26 comprising elements $e$ and $f$ spaced outwardly from respectively opposite sides of the longitudinal center line of the runway, L, in order to feed information to the control tower monitoring the lateral approach of each airplane as it approaches the landing strip. An additional element $g$ mounted on the center line L beyond the initial end of the runway is provided in conventional manner to monitor the field intensity balance between the principal lateral guidance antennae $c$ and $d$ at the control tower.

It is, of course, important to provide from the vertical guidance array 10 an antenna pattern which is devoid of distortions caused by ground reflection interference. It is important that this receiving pattern have no sudden large intensity characteristic variations in its beam region of interest and that its intensity characteristic drop off to a very low value, particularly at a very shallow angle to the ground so that this same pattern constancy will not only be manifested in the immediate vicinity of the landing strip but will be maintained well out beyond the landing strip where the airplane first commences its approach, despite the presence of buildings, low hills and other obstacles far out beyond the landing field which could cause reflections tending to distort the pattern there.

In FIGURES 4, 5 and 6 details of novel antenna antireflection fences 28 and 30 are shown accomplishing the desired result. These cooperate with antenna array 10 (or other antenna system in the broader aspects of their conception) in order to achieve the described result, as depicted in FIGURE 4. A principal problem solved in so doing was that of eliminating the edge effect caused by the presence of the upper edges of the electrically conductive wire mesh shielding fences in a region of high energy level in relation to the array 10. Different edge formations were tried to eliminate this effect without satisfactory results. However, the structure shown in FIGURES 5 and 6 proved to be highly successful. It comprises a plurality of coplanar rows of horizontally spaced vertically oriented half-wavelength conductors 32 supported by dielectric material 33, in any suitable form. The rows are mounted one above the other with half-wavelength spacing between rows, as shown, preferably in the plane of the fence itself. It has found that approximately fifteen coplanar parallel strips or rows of these resonant conductors 32 extending the length of the fence was desirable to produce optimum results and minimize edge effect from the fences. It was also found that two fences were sufficient in this case in order to produce beam cutoff by as much as 30 db in one degree of change of angle from the horizontal to plus-one degree of elevation, and in order to produce a beam intensity characteristic with no sudden changes of magnitude (i.e., by more than 1 db, plus or minus). By providing two arcuate sections of fence structure centered in relation to antenna array 10, as shown in FIGURE 1, no further antenna distortion prevention is necessary.

In the preferred practice of the invention the ground station transmitter 18 transmits interrogation pulse groups at a constant recurrence frequency such as of the order of four hundred cycles per second and the ground station search radar 24 transmits search impulses at the same frequency. Moreover, the beacon interrogator associated with the search radar 24 transmits the same interrogation pulse groups as the lateral guidance antennae $c$ and $d$. These interrogation pulse groups transmitted by the ground station contain identification for the particular ground station doing the interrogating which permits the aircraft to distinguish it from other ground stations. The technique applied to this end is to establish a pulse group period (FIGURE 7A) within which a group G of alternately positive and negative impulses of preselected relative durations are generated according to a prescribed binary code. Each such group G is led or preceded by a pulse of selected polarity, such as $+p$, which indicates to all receiving systems which respond to the group G that this is an identification group as distinguished from a data-conveying group of impulses.

The code pulse groups G are transmitted from the ground station by frequency modulation of a carrier of frequency $f_0$ (such as 100 megacycles per second). Each positive impulse in the group modulates the carrier frequency with one assigned frequency $f_1$, such as 183 megacycles per second, whereas the negative impulses modulate the carrier with a different assigned frequency $f_2$, such as 177 megacycles per second. The resultant modulated outputs are shown as $f_0+f_1$ and $f_0+f_2$, respectively, in FIGURE 7A and when added together represent the transmitter output during the pulse group period, such as one microsecond, during which the transmitted frequency shifts back and forth between two values in accordance with the identification code G.

In the aircraft receiver will be a discriminator (FIGURE 12) producing an output shown in FIGURE 7B representing the original modulating pulse group G. When the airplane is attempting to navigate its course with relation to the particular ground station the navigator or pilot will set a receiver to respond to the particular code G of the desired ground station through use of a decoder and when the appropriate group G is received at the aircraft it will operate an automatic gain control system to be described hereinafter and will also cause operation of a beacon transponder in the aircraft to transmit back to the ground station an aircraft identification code pulse group A followed, if desired, by one or more data-bearing code pulse groups B. The group A, also preferably of one microsecond total duration or of the same duration as the interrogation pulse group G, is preceded or led by a positive pulse, $+p$, which signifies that this group also is an identification group whereas the group B is preceded by a negative pulse, $-p$, signifying that it is a data-bearing group. These pulse groups may in turn be used to modulate a frequency modulation transmitter in the aircraft operating on the same principles as the frequency modulation transmitter at the ground station, wherein the positive pulses produce one frequency and the negative pulses produce a different frequency.

The ground station receives this response to its interrogation code pulse group G and uses the group A for identifying the particular aircraft and, if desired, to present a mark on the radar indicator screen. The ensuing code pulse group B also contained in the aircraft response may carry elevation or other information about the aircraft useful to the ground station.

Thus the aircraft beacon responds to the selected ground station interrogations G and in so doing provides useful navigational data.

During the approach phase, after the aircraft has navigated to a point of final approach to the landing strip for making a landing, a different set of data communication requirements are satisfied. In this phase the code pulse group G transmitted recurringly by the ground station at the base frequency mentioned elicits from the aircraft a response similar to the response during navigation, that is, the response includes an aircraft identification code pulse group, such as A1, with or without an ensuing data group B1. The time interval elapsing between these two communications, $t1$, is the time required for electromagnetic wave energy to propagate from the ground station antenna to the aircraft in order to operate the aircraft transponder (see FIGURE 8). An equal time lapse $t1$ then occurs between a responsive transmission from the aircraft and the reception thereof by the ground station. In accordance with still another feature of this invention the responsive identifying code group A1 transmitted by the aircraft is retransmitted immediately back to the aircraft as an address by which the aircraft system is able to identify the ground station response directed to it. Thus it is enabled to determine that data-bearing code pulse groups, such as $n1$ and $u1$ transmitted by the ground station in direct succession after group A1 relate uniquely to that particular aircraft only. Thus, code pulse group $n1$ may represent vertical position data applicable to the particular aircraft, whereas group $u1$ may represent lateral position data thereof.

Because of the permissible use of code pulse group periods of the order of only one microsecond, and because of the very short propagation time of electromagnetic energy, it is possible to conduct the three-way transmission of code pulse groups signals back and forth between the ground station and the aircraft in such a short portion of the toal operating cycle (e.g. 1/400 of a second) that a number of aircraft in the approach lane of the landing strip will be enabled to take advantage of the same ground station transmitting facility. Typically, if the different aircraft are spaced apart along the approach zone by as much as only two thousand feet, there will be no interference between the automatic exchanges of identification and data between the ground station and the transponder systems of the respective aircraft. Thus, in FIGURE 8 the time interval $t2$ represents the interval between transmission of the ground station identification group G and the reception of that group and retransmission thereof from a second aircraft with its own identification A2 and its data group B2 (if any) back toward the ground station. This interval $t2$ is sufficiently long if the second aircraft is of the order of two thousand feet, or more, behind the first aircraft that the final transmission from the ground station to the first aircraft will have occurred before initial transmission to the second aircraft is required to occur. In this manner one ground station is capable of handling a large volume of traffic on a landing strip.

That portion of the ground station equipment associated with the landing phase of control appears in FIGURE 9, wherein only a single pair of vertical guidance antennae $a$ and $b$ and a single pair of horizontal guidance antennae $c$ and $d$ are illustrated in connection with the associated receivers 12 and 16. The output of receiver 12 includes the monopulse interferometer and binary stage 36, and the output of receiver 16 includes the similar stage 38. The readout circuits for receiver 12 and interferometer stage 36 comprise the banks of transistors 40 and 42 arranged in pair serially connected between the negative and positive buses 44 and 46. Similar transistor banks 48 and 50 connected between negative and positive buses 52 and 54 form a readout circuit arrangement for the receiver 16 and interferometer 38. The base electrodes of the transistors in bank 42 are connected to successively spaced points along the delay line 56. The bases of transistors in bank 50 are similarly connected to spaced points along delay line 58. The readout function for the storage circuits of interferometer 36 is performed by applying a negative scanning pulse $-p$ to one end of delay line 56, as in the case of interferometer 38. These negative scanning pulses are derived from the trigger circuit 60 which responds to the initial positive pulse $+p$ delivered at the beginning of an aircraft identification code pulse group A provided at the output of the receiver amplifier 62. Thus, whenever an identification group A is received in the receiver 12, a negative scanning pulse $-p$ is produced by trigger circuit 60 for application to the delay lines 56 and 58. The circuit 60 has a delayed recovery so that only the initial pulse $-p$ of the group A operates this trigger circuit. An added delay line section $58a$ is incorporated at the head end of the delay line 58 which creates an additional delay sufficient to cause the readout function of interferometer 38 to follow immediately behind that of interferometer 36 instead of overlapping it. The resultant vertical position data stored in the interferometer stage 36 is fed in the form of a code pulse group $n$ through conductor 64 to transmitter 18, immediately after which lateral guidance information stored in interferometer 38 is fed as the code pulse group $u$ through conductor 66 to the transmitter.

The received code pulse group A delivered by amplifier 62 is also fed directly as modulation to the transmitter 18 through the conductor 68. This pulse group reaches the transmitter 18 prior to the pulse group $n$ so as to provide an address A to the aircraft which enables it to identify data groups $n$ and $u$ as those applicable to its own position. In order to insure completion of retransmission of pulse group A by transmitter 18 before pulse group $n$ is applied to the transmitter, trigger circuit 60 incorporates an operating delay which elapses before scanning pulse $-p$ is applied to delay line 56.

Timer 76 sets the basic interrogation frequency of the ground system, at which interrogation-identification pulse groups G are transmitted by transmitter 18. To the latter end, a third bank of transistors 70 is provided having collectors connected respectively to spaced energy transfer points along delay line 56. The particular ground station identifying code G is established through the settings of switches in the bank 72 connected to the respective transistors. A pulse group G is delivered by way of conductor 74 to transmitter 18 each time a positive scanning pulse $+p$ is applied to the initial end of delay line 56 by timer 76.

In order to make possible use of a single delay line 56 to cooperate with both of the encoders associated with it, a blanking gate 78 deactivates the interferometer 36, effectively isolating delay line 56 from the storage circuits of this interferometer during generation of a code group G. This it does in response to delivery of a positive scanning pulse from timing source 76. Similarly a blanking gate 80 deactivates the identification encoder switch bank 72 is response to a trigger pulse $-p$ delivered by the trigger circuit 60, so that there will be no interference with generation of code pulse groups $n$ and $u$. A reset gate 82 cyclically reactivates the identification encoder switch bank 72 in response to each positive timing pulse $+p$.

In the operation of the ground station transponder system shown in FIGURE 9, the sequence is as follows: A positive timing pulse $+p$ delivered by the timing pulse source 76 every 1/400 of a second, for example, resets the switch bank 72 and applies a positive scanning pulse to the delay line 56 in order to produce a code pulse group G in the output conductor 74 for modulating the transmitter 86 accordingly. While this modulation is being applied to the transmitter blanking gate 78 deactivates the monopulse interferometer 36. Thereafter, a time interval expires during which the transmitted energy propagates to the aircraft to elicit a response from the latter and for that response to propagate back to the ground station to enter the receivers 12 and 16 through antennas *a*, *b* and *c*, *d*, respectively. The response from the aircraft includes a code pulse group A which identifies the aircraft and which is applied directly to the transmitter 18 from amplifier 62 in order to address the aircraft once again, this time with its own identification code. After expiration of the code pulse group A a negative pulse $-p$ is delivered by the trigger circuit 60 for application to the initial end of delay line 56 and to the initial end of delay line 58. Blanking gate 80 is simultaneously operated to deactivate the switch bank 72 so that only the data stored in binary digital form in the storage circuits of interferometer 36 will initially reach the transmitter as a second code pulse group *n*. Group *n* immediately succeeds group A. After group *n*, group *u*, representing the binary digital code pulse group defining lateral guidance position, is delivered through conductor 66 to the transmitter, the spacing between groups *n* and *u* being assured through the interposing of an additional delay section 58*a* of delay line 58.

Figure 9:
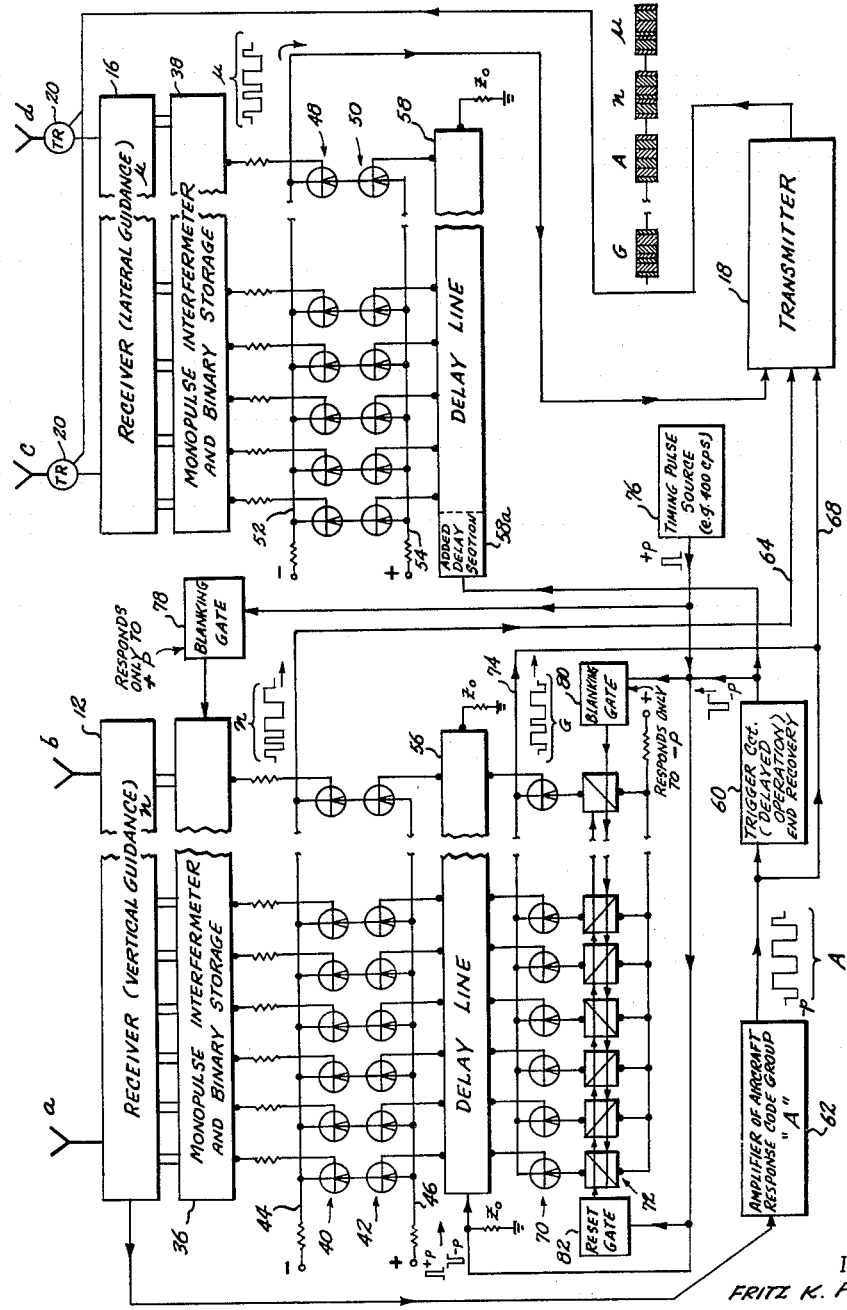
FIGURE 9 is a block diagram of the ground station system for determining lateral and vertical glide path position.

Reference is made to FIGURE 1 of the above-cited copending application Serial No. 116,547 for further details of the interferometer circuit apparatus used in the receiver shown in FIGURE 9.

Figure 10:
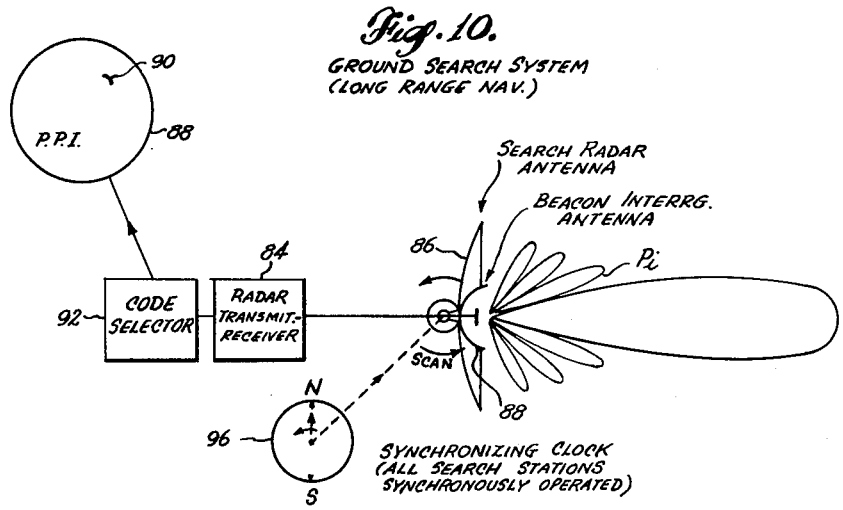
FIGURE 10 is a simplified diagram of a search radar with beacon interrogation means and an azimuth reference clock timing for use in navigational phases of the system.
Figure 11:
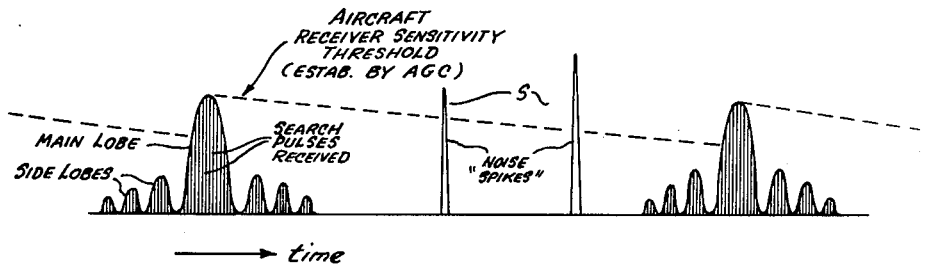
FIGURE 11 is a wave diagram showing the automatic gain control technique used by the present system for suppression of side lobes in the beacon interrogator antenna associated with the search radar.
Figure 12:
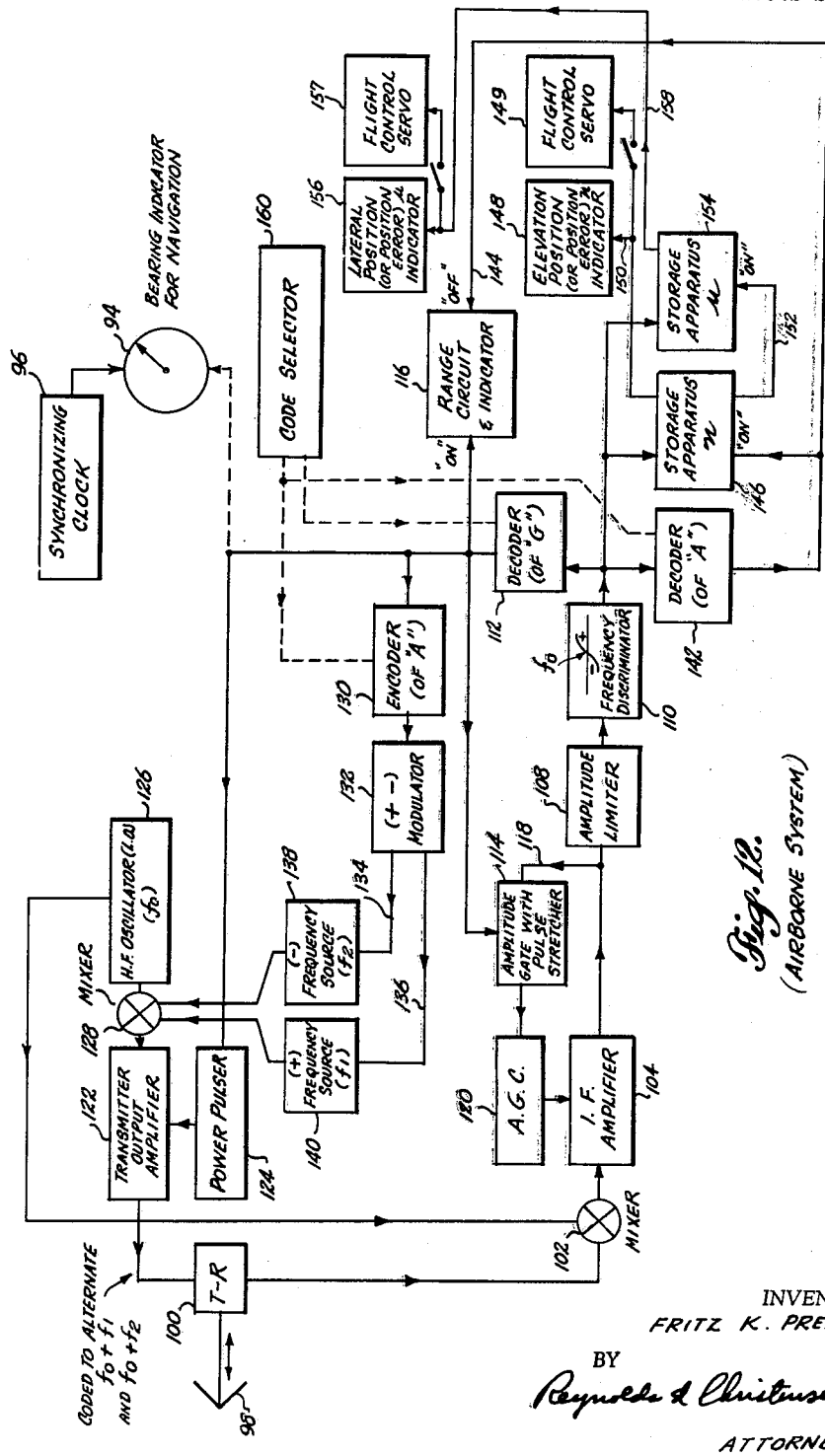
FIGURE 12 is a block diagram of the cooperating system in an aircraft, employed both during the navigation and landing phases of the approach.

In FIGURES 10, 11 and 12 additional features of the ground station equipment and related functioning of aircraft transponder equipment, and particularly the gain control apparatus therein, are depicted. In FIGURE 10 the radar station is shown as comprising a transmitter-receiver system 84 coupled to the scanning antenna 86 which is rotated continuously in azimuth. A plan position indicator 88 connected to the transmitter-receiver provides the usual position mark 90 on the indicator screen at a location representing the range and azimuth of an aircraft in the field of search. If desired, a code selector 92 may be interposed between the indicator and the transmitter-receiver 84 in order to restrict the display to the beacon response of only one aircraft at a time on the basis of the response code A which identifies that particular aircraft. In this manner, it is possible to follow the progress of one aircraft to the exclusion of other aircraft in the vicinity.

By the same token, the aircraft itself desirably incorporates decoding equipment responsive only to the identifying code G of a particular ground station radar. To this end a beacon interrogator system including the antenna 88 may be provided with the radar in order to provide an interrogation impulse group G on each transmitted pulse cycle. Response of the aircraft transponder to such an interrogation pulse group produces the aircraft signal image on the PPI screen 88 in the usual manner. In order to suppress the effect of side lobes in the interrogation transmitter pattern $P_i$, automatic gain control circuitry in the aircraft transponder is provided to establish a gain level in its receiver which renders it sensitive only to the greater intensity level of the main lobe in the antenna pattern $P_i$ to the exclusion of side lobes. Moreover, because of the provision of a decoder in the aircraft receiver ahead of the automatic gain control circuitry, the automatic gain control system rejects random noise impulses, such as the noise spikes S in the receiver, as a factor influencing gain control level.

Referring now to FIGURE 12, showing the preferred aircraft system, for navigation purposes a bearing indicator 94 operated by a synchronizing clock 96 is energized to produce a mark or a light spot on a calibrated azimuth scale at the instant of reception of a code pulse group G from a particular ground station. A synchronizing clock 96 at the ground station controls azimuth position of the scanning radar on the same cyclical basis so that the aircraft indicator 94 will always indicate the direction of pointing of the ground radar at the time of energy reception in the aircraft, hence will indicate bearing of the aircraft to the ground station. In order to operate the indicator 94, energy received in antenna 98 passes through the transmit-receive switch 100 to the superheterodyne mixer stage 102 which is energized by the output of a local oscillator 126 in order to apply a detectable signal to the IF amplifier 104. The output of amplifier 104 is passed through an amplitude limiter 108 to a frequency discriminator 110 which acts as a detector reproducing the original positive and negative code impulses generated at the ground station. Thus, code pulse group G is detected in the aircraft for application to a decoder 112. If the particular group G appears for which this decoder is set, the decoder produces an output, otherwise no output. Such output energizes indicator 94 and is also applied to an amplitude gate 114 and to a range circuit 116 to initiate a timing interval in the latter.

Amplitude gate 114 is energized only in response to the output of decoder 112. When thus energized, this gate passes a portion of the received energy, as delivered by the IF amplifier 104 through conductor 118, to the AGC circuit 120 which establishes the sensitivity level of the IF amplifier. Thus, as the ground station radar beam sweeps across the point of space occupied by the aircraft and the interrogation code group signals G transmitted by the beacon antenna 88 produce a response in the output of decoder 112 a portion of the received energy is applied from conductor 118 to the AGC circuit by the gate 114. This energy thus being stored in the AGC circuit increases as the peak of the main lobe of the scanning ground station beam approaches direct alignment with the aircraft position. When that point is reached it establishes a peak of bias voltage determining the amount of gain reduction applied to the IF amplifier. The storage time constant of the AGC circuit 120 is sufficient that this bias level drops off only fractionally in the period between times when the main lobe of the radar sweeps across the aircraft position (see FIGURE 1) and never drops off so far that the side lobes in the radar are effective to pass through the IF amplifier 104. Thus, side lobe suppression is achieved with respect to the selected ground station with reference to which the aircraft wishes to identify its position. This it does on a selective basis, using the code of only that particular ground station as a means to operate the amplitude gate which controls the AGC circuit 120. The amplitude gate 114 itself includes a pulse stretcher which is capable of maintaining energization of the gate for a period following reception of each individual code pulse group G sufficient to overlap the next succeeding decoded group G but not for a much greater period than this. Consequently, reception of one code pulse group conditions the amplitude gate for operating the AGC in response to the next succeeding code pulse group. Noise spikes received by or generated within the amplifier stages do not, of course, carry the special code required to produce a response in the output of decoder 112 and, as a result, random noise occurring in the intervals between sweeps of the radar do not influence the gain level of the receiver.

In response to the selected ground station code pulse group G the aircraft system transmitter 122 is activated by the power pulser 124 from a normally low-level quiescent state of little or no amplification of signal from high frequency oscillator 126 feeding the transmitter by way of mixer 128. During the brief period (usually about one microsecond) when transmitter 122 is thus energized by the power pulser 124, the transmitter is modulated to transmit the aircraft's own identification code. For this purpose the encoder 130, responsive to the decoder 112, delivers a code pulse group of successive positive and negative impulses to the modulator 132 having two output leads 134 and 136. These leads are alternatively energized during the respective positive and negative impulses in the modulator. An oscillator or frequency source 138 operated at a frequency $f_2$ is thus energized through conductor 134 whereas a second frequency source 140 operating at a different frequency $f_1$ is energized by conductor 136. These two frequency sources are connected to the mixer 128 in order to modulate the carrier frequency, $f_0$, alternately in response to the positive and negative impulses delivered by the encoder 130. Modulator 132 may also be operated by one or more additional encoders if data pulse groups are to be transmitted by transmitter 122 following the identification group A as previously mentioned. These additional encoders are omitted from the illustration in FIGURE 12 but will be understood to represent units controllingly connected to the modulator 132 and in turn responsive to a suitable data source such as a radio altimeter or other source of information to be transmitted.

As previously explained, the ground station transponder is operable to receive the identification code pulse group A transmitted by the aircraft system and to retransmit that same pulse group as an address back to the aircraft immediately preceding transmission of position data in the form of other code pulse groups for controlling or guiding the approach. Thus, the aircraft system also includes a decoder 142 responsive to the aircraft's own pulse group A and capable of rejecting all other code pulse groups. When this decoder detects the reception, back from the ground station, of the group A, it terminates the timing interval in the range circuit 116 through the connection 144 and thereby enables the range circuit to measure the time interval elapsing between the original transmission of group A from the aircraft, and the reception of the same pulse group back at the aircraft from the ground station, which is a direct measure of the range from the aircraft to the ground station. Such range circuit apparatus may comprise time-metering binary digital counting apparatus which is set into operation by an initiating impulse and which is terminated by a later impulse, or it may comprise suitable analog type apparatus of any well known or suitable type.

A second function of the aircraft decoder 142 is to condition the aircraft receiving circuits to register the data carried by the code pulse groups which follow the address group A. Thus, the output of decoder 142 is applied to storage apparatus 146 which is capable of registering the value or data carried by the code pulse group $n$ representing elevation position of the aircraft. The same information may be conducted from the storage device 146 to an elevation position or position error indicator 148 and/or flight control servo 149 through conductor 150.

The output of storage apparatus 146 may also include a trigger pulse or gate applied through conductor 152 to the storage apparatus 154 in order to condition the latter for reception of the value or data borne in the next succeeding pulse group $u$ indicative of lateral position or position error. This data in turn may be applied to the indicator 156 and/or flight control servo 157 through conductor 158.

A code selector 160 is or may be provided by which to adjust the settings of the encoder 130 and of the associated decoders 112 and 142, depending upon code assignments for the particular aircraft and the setting required to cooperate with a particular ground station.

Figure 13:
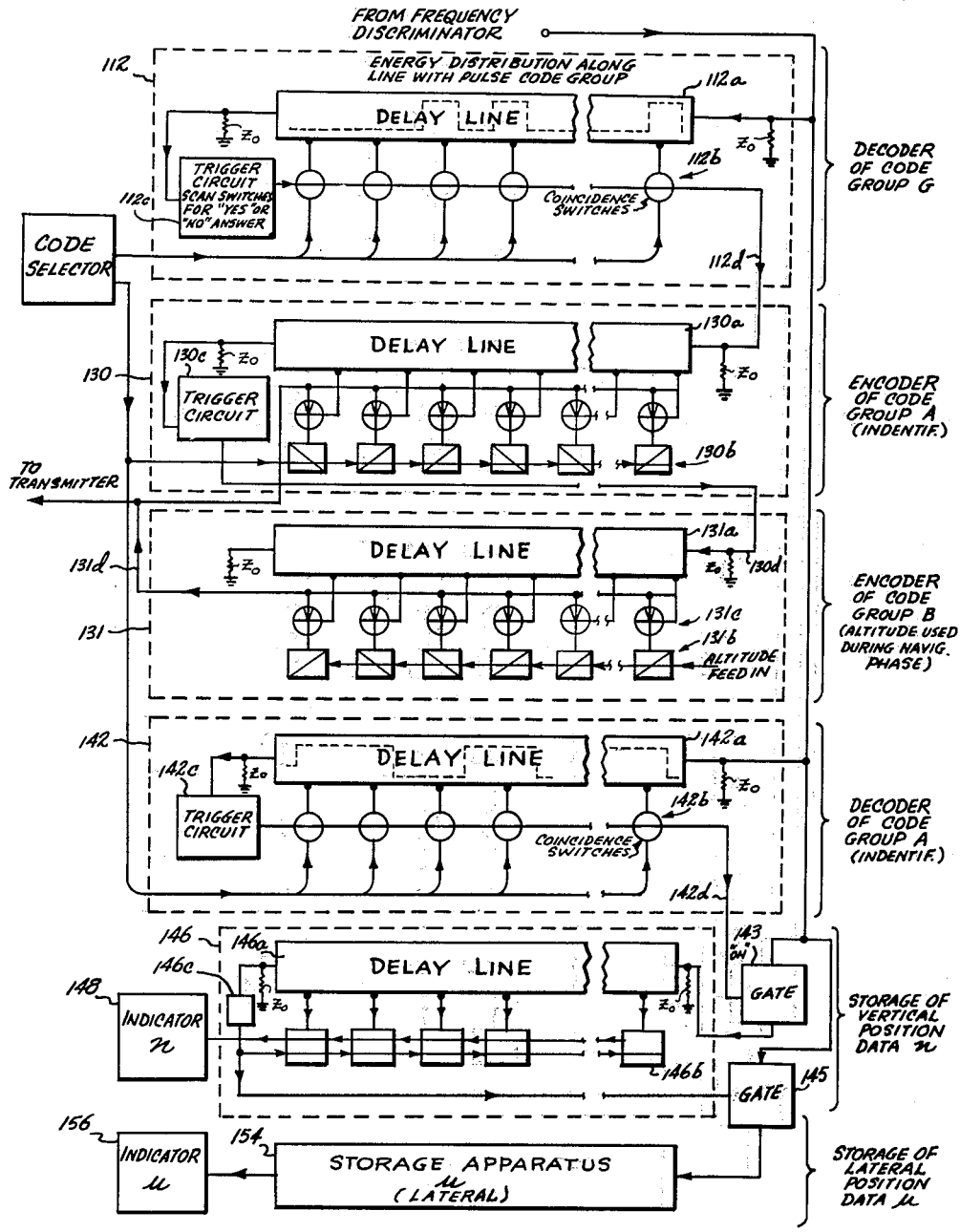
FIGURE 13 is a more detailed block diagram of that portion of the aircraft system functioning during the landing phases of the approach.

In FIGURE 13 somewhat more detail is shown for the coding and decoding as well as the data storage portions of the aircraft system. Referring to FIGURE 13, the code pulse groups issuing from the frequency discriminator 10 pass to the different decoders and storage devices as shown. The decoder 112 by which ground station code pulse group G is recognized for responsive action comprises a delay line 112a terminated at both ends in its characteristic impedance and having a plurality of coincidence switch devices 112b connected respectively to energy transfer points successively spaced along the delay line. These coincidence switches are set by the code selector 160 in accordance with the code G of the particular ground station to which the aircraft system is to be made responsive. By the time the first pulse in the group, which always has a certain polarity for an identification group of pulses, reaches the opposite end of delay line 112 in order to operate the trigger circuit 112c there will be a certain distribution of voltage along the length of the delay line the pattern of which corresponds to the code pulse group G. This pattern, expressing the complete code pulse group G, must correspond to the polarity settings of the respective coincidence switches 112b in order for the output pulse from the trigger circuit 112c to pass through all of the switches serially and into the output conductor 112d. If the received code pulse group differs from that selected by the code selector 160, the trigger circuit impulse will not reach the conductor 112b and the system will not respond to the code group. In the same fashion random or noise signals are also rejected as are the transmissions from the aircraft itself.

When an output pulse in delivered through conductor 112d in response to a proper code pulse group G applied to delay line 112a, the airplane system responds by delivering to the transmitter an identifying code pulse group A from the encoder 130. The encoder 130 comprises a delay line 130a terminated at both ends in its characteristic impedance and connected at one end to the conductor 112d. A bank of switches 130b is positionally set by code selector 160 to represent the identifying code A for the particular aircraft, and this code is then generated by passage of the scanning impulse along the delay line 130a in order to produce a sequence of alternate positive and negative impulses of predetermined duration, representing the required code. The instant the scanning pulse reaches the far end of delay line 130a to operate the trigger circuit 130c an impulse is delivered by way of conductor 130d to a delay line 131a of the encoder 131.

Encoder 131 has an output conductor 131d leading to the transmitter and delivers a code pulse group representing the desired data to be transmitted following the identification code group A, i.e., a group B representing aircraft altitude for example. Altitude may be fed into the encoder 131 from a radio altimeter, barometer or other device to control the setting of the switches in the bank 131b which in turn establish polarities by which impulses from the delay line are transmitted through the transistors of the bank 131b connected to the delay line at spaced points along its length in the manner previously described for other encoding units in the total system.

It has been mentioned that the ground station, in response to the receipt of a code pulse group A back from an interrogated aircraft transmits the aircraft's own code pulse group A as an address preceding data to be transmitted. Thus, the frequency discriminator in the aircraft system is also connected to a decoder of code pulse group A, 142. This decoder comprises the delay line 142a and the bank of coincidence switches 142b controlled as to setting by the code selector 160 as in the case of decoder 112. The electrical length of the delay line is such that by the time the first impulse in the code pulse group A reaches the far end of the delay line in order to operate the trigger circuit 142c, by which the coincidence switches are activated, the full code group will be represented as a pattern of voltage distribution along the delay line 142a. Thus, if the received code pulse group is the correct group A for the particular aircraft, as chosen by code selector 160 controlling the switches 142b, then an output pulse will be delivered at that instant through the conductor 142d for operating the gate 143. With gate 143 thus energized a code pulse group immediately following address group A is permitted to pass through the gate to the storage apparatus 146 by which vertical position data $n$ in this case is registered in the airplane. This storage apparatus comprises a delay line 146a terminated at both ends in its characteristic impedance and a bank of binary digital storage elements 146b which are energized to record the pattern of voltage along the delay line when the first pulse in the group, which by its polarity identifies the group as a data group as distinguished from an identification group, reaches and operates the trigger circuit 146c. A vertical position indictor 148 may be operated by the bank of elements 146b. Trigger circuit 146c next operates gate 145 and permits the succeeding code pulse group carrying lateral position data $u$ to pass to the storage apparatus 154. The latter is or may be similar to the apparatus 146, in order to register lateral position data in the aircraft and, if desired, to operate the lateral position indicator 156 and flight servo 157, as mentioned above.

In FIGURE 14 the various code pulse groups which are active in the functioning of the apparatus shown in FIGURE 13 are depicted. It will again be noted that the ground station code group G and that the aircraft station code group A, by which these stations are identified, are preceded by or started with pulses of positive polarity ($+p$), whereas the data-bearing groups are preceded by or started with negative pulses $-p$. Trigger circuits 112c and 142c are designed to respond only to the positive pulses preceding the identification code pulse groups in order to operate the respective decoders 112 and 142. On the other hand, trigger circuit 146c is designed to respond only to the negative pulses $-p$ identifying data pulse groups for operating the storage apparatus 146 and thereby the apparatus 154.

These and other aspects of the invention will be recognized by those skilled in the art on the basis of the foregoing disclosure of the presently preferred embodiment and practice thereof.

I claim as my invention:

1. In an aircraft landing system, in combination with a landing strip, a pair of forwardly directed receiving antenna elements operable at the same electromagnetic wave energy frequency and disposed in an array which defines a composite antenna pattern characterized by a family of surfaces projecting longitudinally of the landing strip and converging rearwardly and into approximately parallel relationship with a selected aircraft touchdown path to the landing strip, each of said surfaces being defined by points from which there is a constant difference in the electrical distances to the respective antenna elements, and phase comparator means having inputs respectively connected to said elements and operable to convert into an electrical response the electrical phase difference between electromagnetic wave energy signals received by said elements from an aircraft in said pattern, and means responsively connected to said phase comparator means, operable to transmit information related to said response for indicating position of the aircraft transversely in relation to said surfaces.

2. The system defined in claim 1, wherein the antenna elements are mounted at respectively opposite sides of the landing strip and the family of surfaces comprise two groups of hyperboloids symmetrical about a vertical plane intermediate the sides of the landing strip.

3. The system defined in claim 1, wherein the antenna elements are mounted at a location elevated above the surface plane of the landing strip and spaced laterally from one side of the landing strip at the forward end potrion thereof, with one such element spaced above the other on a line which is tilted back from the vertical by a small angle approximating the landing strip touchdown slope angle, and the family of surfaces comprise a group of hyperboloid surfaces which intersect the vertical longitudinal midplane of the landing strip in hyperbolas of asymptotic slope angles graduated upwardly from said touchdown slope angle.

4. The system defined in claim 3, and means to suppress irregularities in the intensity pattern of the antenna array and to produce a sharp cut-off therein at a low elevation angle above ground, said means comprising a radiation shielding fence standing on the ground in front of the array and extending transversely to the propagation to a height below the desired angle of cut-off, and a plurality of horizontal rows of conductive elements, said elements being of resonant half-wavelength dimensioning and spacing, said rows being mounted in a substantially coplanar array projecting upwardly from the top of said shielding fence to a height approximately corresponding to the desired cut-off elevation angle.

5. The system defined in claim 4, wherein the antenna elements and the conductive elements are vertically oriented and are one-half wavelength long and spaced transversely by one-half wavelength, and wherein the number of rows is of the order of fifteen.

6. In an aircraft landing system, in combination with a landing strip, a first pair of forwardly directed receiving antenna elements mounted at respectively opposite sides of the landing strip in an array which defines a composite antenna pattern characterized by two groups of hyperboloid surfaces symmetrical about a vertical plane intermediate the sides of the landing strip, each of said surfaces being defined by points from which there is a constant difference in the electrical distances to the respective antenna elements, phase comparator means connected to said elements and operable to detect the electrical phase difference therein of electromagnetic wave energy directed from an aircraft in said pattern and incident on both of said elements, thereby to detect lateral positional changes of the aircraft relative to said surfaces, a second pair of antenna elements mounted at a location elevated above the surface plane of the landing strip and spaced laterally from one side of the landing strip at the forward end portion thereof, with one such element of the second pair spaced above the other element thereof on a line which is tilted back from the vertical by a small angle approximating the landing strip touchdown slope angle, thereby to define a composite radiation pattern characterized by a group of hyperboloid surfaces which intersect the vertical longitudinal midplane of the landing strip in hyperbolas of asymptotic slope angles graduated upwardly from said touchdown slope angle, and means connected to said elements of the second pair and operable to detect the electrical phase difference therein of electromagnetic wave energy directed from the aircraft and incident on both of said latter elements, thereby to detect vertical positional changes of the aircraft relative to said latter surfaces.

7. The system defined in claim 6, wherein each of the phase comparator means includes a means to store the value of the detected phase difference of the associated antenna pair, means to scan first one and then the other of said storage means and convert the respective values of phase difference thereof into groups of successive binary code pulses, and means to transmit said groups of impulses on a carrier by frequency modulation of the carrier with either of two different frequencies representing respectively the binary digit values.

8. The system defined in claim 1, wherein the phase comparator means includes a means to store the value of the detected phase difference, means to scan said storage means and convert such value into a group of successive binary code pulses, and means to transmit said group of impulses on a carrier by frequency modulation of the carrier with either of two different frequencies representing respectively the binary digit values.

9. In a data transmission system, means to store data in a scannable register comprising a series of binary digit storage place switching devices, a frequency-modulation transmitter operable at a carrier frequency and including sources of two distinct modulation frequencies alternatively operable to modulate the carrier for data transmission, each of said storage place switching devices having two outputs alternatively conditioned for energization by the presence or absence of a binary digit bit stored in such place and operatively connected each to the sources for selectively modulating the carrier thereby in response to energization of one output or the other, respectively, and means to energizingly scan the switching devices in rapid sequence with an energizing impulse, thereby to selectively modulate the carrier with frequencies which change back and forth in a sequence related to the value of data stored.

10. The system defined in claim 9, wherein the energizing scan means comprises a delay line having along its length a series of energy transfer connections to the respective switching devices, and means to apply an impulse of energy to one end of the delay line to effect energization of the selected outputs of the respective switching devices in sequential order.

11. The system defined in claim 10, wherein the two outputs of each switching device are both connected electrically to both sources, wherein one source operates in response to a negative polarity output and the other source to a positive polarity output, and wherein energization of the outputs of a switching device occur with positive and negative polarity, respectively.

12. In an aircraft landing guidance system, an antenna array mounted at a distance transversely outward from the landing strip and above the landing strip elevation, said array having transversely spaced antenna elements operable at the same frequency and defining a composite antenna pattern which extends from said array forwardly and upwardly in the space above the landing strip and above the approach to the landing strip, which pattern embodies a series of curved vertically spaced surfaces graduated in slope and extending downwardly and rearwardly along the landing strip into substantial convergence with a selected aircraft touchdown slope line which intersects the landing strip at a shallow acute angle, means to transmit electromagnetic energy of a selected frequency between an aircraft in the pattern and said antenna elements, and receiver means operatively associated with said antenna array, including phase comparator means having two inputs, one for each of at least two such antenna elements, operable to convert into an electrical response the electrical phase difference between received electromagnetic wave energy propagating between an aircraft in the pattern and the two respective antenna elements, said response being thereby related to position of such aircraft in transverse relation to said surfaces.

13. The system defined in claim 12, wherein the antenna elements are spaced vertically on a line which is tilted back in a vertical plane substantially parallel to the length of the landing strip, the angle of tilt being substantially equal to the touchdown slope line acute angle.

14. A ground based antenna system directed generally horizontally in a vertical plane, and means to suppress irregularities in the intensity pattern of the antenna system and to produce a sharp cut-off therein at a chosen elevation angle above ground, said means comprising a radiation shielding fence standing on the ground in front of the array and extending transversely to the propagation to a height below the desired angle of cut-off, and a plurality of horizontal rows of conductive elements, said elements being of resonant half-wavelength dimensioning and spacing, said rows being mounted in a substantially coplanar array projecting upwardly from the top of said shielding fence to a height approximately corresponding to the desired cut-off elevation angle.

15. A ground interference screening device for electromagnetic wave energy propagation, comprising a shielding fence standing on the ground and extending transversely to the propagation to a height below the desired angle of cut-off, and a plurality of horizontal rows of conductive elements, said elements being of resonant half-wavelength dimensioning and spacing, said rows being mounted in a substantially coplanar array projecting upwardly from the top of said shielding fence to a height approximately corresponding to the desired cut-off elevation angle.

16. In an aircraft landing guidance system, a ground station including position-finding means at the landing strip operable in response to radiation propagating from an approaching aircraft to determine position of the aircraft in relation to a predetermined landing path, periodically operable electromagnetic wave energy transmitter means in the aircraft to which the position-finding means responds and operable to interrogate the ground station by transmitting periodically recurrent pulse groups each coded to identify the aircraft, and each group lasting for a small fraction of the period between successive transmissions, transponder means at the ground station supplied with aircraft position data from said position-finding means and operable in response to each such interrogation pulse group to return a corresponding identifying address pulse group back to the aircraft followed by at least one additional pulse group coded to supply position data applicable to such aircraft, said latter identifying address pulse group and following additional pulse group(s) collectively lasting for a small fraction of said period and receiver means in the aircraft including decoder means selectively operable to decode the identifying address pulse group, and storage means rendered operable by the decoder means to register such position data.

17. In an aircraft landing guidance system, a ground station including position-finding means at the landing strip operable in response to energy propagating from an approaching aircraft to determine position of the aircraft in relation to a predetermined landing path, periodically operable electromagnetic wave energy transmitter means in the aircraft to which the position-finding means responds and operable to interrogate the ground station by transmitting periodically recurrent pulse groups each coded to identify the aircraft and each group lasting for a small fraction of the period between successive transmissions, transponder means at the ground station supplied with aircraft position data from said position-finding means and operable instantaneously in response to each such interrogation pulse group to return a corresponding identifying address pulse group back to the aircraft followed by at least one additional pulse group coded to supply position data applicable to such aircraft, said latter identifying address pulse group and following additional pulse group(s) collectively lasting for a small fraction of said period, and receiver means in the aircraft including decoder means selectively operable to decode the identifying address pulse group, and storage means rendered operable by the decoder means to register such position data, said receiver means further including interval timer means initiated by transmission of an interrogating pulse group and terminated by the decoder in response to decoding of said first pulse group, thereby to measure range from the aircraft to the ground station.

18. In an aircraft landing guidance system, a ground station including position-finding means at the landing strip operable in response to energy propagating from an approaching aircraft to determine position of the aircraft both vertically and laterally in relation to a predetermined landing path, periodically operable electromagnetic wave energy transmitter means in the aircraft to which the position-finding means responds and operable to interrogate the ground station by transmitting periodically recurrent pulse groups each coded to identify the aircraft and each group lasting for a small fraction of the period between successive transmissions, transponder means at the ground station supplied with aircraft position data from said position-finding means and operable instantaneously in response to each such interrogation pulse group to return a corresponding identifying address pulse group back to the aircraft followed by successive pulse groups coded to supply vertical and lateral position data, respectively, applicable to such aircraft, said latter identifying address pulse group and following additional pulse group(s) collectively lasting for a small fraction of said period and receiver means in the aircraft including decoder means selectively operable to decode the identifying address pulse group, and storage means rendered operable by the decoder means to register such position data, said receiver means further including interval timer means initiated by transmission of an interrogating pulse group and terminated by the decoder in response to decoding of said first pulse group, thereby to measure range from the aircraft to the ground station.

19. The system defined in claim 18, wherein the aircraft carries a beacon transponder including said transmitter means and receiver means therein, the ground station includes an interrogating transmitter operable recurringly to transmit a pulse code group identifying the ground station, and the aircraft beacon transponder receiver means further includes a decoder selective to said ground station identifying pulse code group for operating the aircraft transmitter means in response thereto.

20. The system defined in claim 19, wherein the ground station transmitter means and aircraft transmitter means transmit said pulse groups as sequential pulses which alternate in frequency between two different values.

21. The system defined in claim 16, wherein the ground station transmitter means and aircraft transmitter means includes frequency modulation means operable to transmit said pulse groups as sequential pulses which alternate in frequency between two different values.

22. The system defined in claim 16, wherein the aircraft carries a beacon transponder including said transmitter means and receiver means therein, the ground station includes an interrogating transmitter operable recurringly to transmit a pulse code group identifying the ground station, and the aircraft beacon transponder receiver means further includes a decoder selective to said ground station identifying pulse code group for operating the aircraft transmitter means in response thereto.

23. The system defined in claim 22, wherein the ground station transmitter means and aircraft transmitter means transmit said pulse groups as sequential pulses which alternate in frequency between two different values.

24. The system defined in claim 22, wherein the ground station transponder includes a scannable register responsively connected to the position-finding means for storing data therefrom and comprising a series of binary digit storage place switching devices, a frequency-modulation transmitter operable at a carrier frequency and including sources of two distinct modulation frequencies alternatively operable to modulate the carrier for data transmission, each of said storage place switching devices having two outputs alternatively conditioned for energization by the presence or absence of a binary digit bit stored in such place and operatively connected each to the sources for selectvely modulating the carrier thereby in response to energization of one output or the other, respectively, and means to energizingly scan the switching devices in rapid sequence with an energizing impulse, thereby to selectively modulate the carrier with frequencies which change back and forth in a sequence related to the value of data stored.

25. The system defined in claim 24, wherein the energizing scan means comprises a delay line having along its length a series of energy transfer connections to the respective switching devices, and means to apply an impulse of energy to one end of the delay line to effect energization of the selected outputs of the respective switching devices in sequential order, said means to apply an impulse of energy being operable in response to the aircraft's interrogation pulse group.

26. The system defined in claim 25, wherein the ground station transmitter comprises a second, similar scannable register whose digit storage place switching device outputs are conditioned in accordance with the ground station identifying code, said second scannable register switching devices being also connected to respective energy transfer connections spaced successively along the delay line, timing means operable to apply an impulse recurringly to said one end of the delay line for initiating the pulse group exchange between aircraft and ground station transponders, and means to blank each scannable register while the other scannable register is being scanned.

27. The system defined in claim 25, wherein the position-finding means comprises a pair of antenna elements spaced apart transversely to the length of the landing strip, and means to measure the phase relationship of energy in the respective elements received from the aircraft, including means to store the value of such measurement in the first-mentioned scannable register.

28. The system defined in claim 22, wherein the aircraft receiver means further comprises automatic gain control apparatus including receiver gain control circuit gated selectively by said decoder to store a portion of the received energy in response to the reception of the selected ground station identifying pulse code groups.

References Cited by the Examiner
UNITED STATES PATENTS

| | | | |
|---|---|---|---|
| 2,593,485 | 4/52 | Pickles et al. | 343—107 |
| 2,793,363 | 5/57 | Gray | 343—107 |
| 2,800,292 | 7/57 | Moseley | 343—107 |
| 2,878,469 | 3/59 | Casabona | 343—112 |
| 2,938,206 | 5/60 | Davis et al. | 343—100 |
| 2,980,903 | 4/61 | Hagopian et al. | 343—6.5 |

CHESTER L. JUSTUS, *Primary Examiner.*